United States Patent
Liu et al.

(10) Patent No.: US 9,762,966 B2
(45) Date of Patent: Sep. 12, 2017

(54) VIDEO DISPLAYING METHOD AND VIDEO DECODING METHOD WHICH CAN OPERATE IN MULTIPLE DISPLAY MODE AND ELECTRONIC SYSTEM APPLYING THE METHOD

(71) Applicant: MEDIATEK INC., Hsin-Chu (TW)

(72) Inventors: Shan Liu, San Jose, CA (US);
Xiaozhong Xu, Fremont, CA (US);
Jacob Yu, Los Altos, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/931,804

(22) Filed: Nov. 3, 2015

(65) Prior Publication Data
US 2016/0212486 A1     Jul. 21, 2016

Related U.S. Application Data

(60) Provisional application No. 62/103,739, filed on Jan. 15, 2015, provisional application No. 62/194,812, filed on Jul. 20, 2015.

(51) Int. Cl.
| | | |
|---|---|---|
| H04N 21/472 | (2011.01) | |
| H04N 21/2343 | (2011.01) | |
| H04N 21/482 | (2011.01) | |
| H04N 21/462 | (2011.01) | |
| H04N 21/4402 | (2011.01) | |
| H04N 21/458 | (2011.01) | |
| H04N 21/426 | (2011.01) | |
| H04N 5/445 | (2011.01) | |

(52) U.S. Cl.
CPC ... *H04N 21/47202* (2013.01); *H04N 5/44591* (2013.01); *H04N 21/2343* (2013.01); *H04N 21/42607* (2013.01); *H04N 21/440281* (2013.01); *H04N 21/458* (2013.01); *H04N 21/4622* (2013.01); *H04N 21/4821* (2013.01)

(58) Field of Classification Search
None
See application file for complete search history.

(56) References Cited

U.S. PATENT DOCUMENTS

| | | | |
|---|---|---|---|
| 9,282,290 B2 * | 3/2016 | Shanks | A63F 13/12 |
| 2003/0001878 A1 * | 1/2003 | Matsumoto | H04N 5/45 715/716 |
| 2003/0068155 A1 * | 4/2003 | Vasilevsky | H04N 5/76 386/236 |
| 2006/0168637 A1 * | 7/2006 | Vysotsky | H04L 12/1813 725/116 |
| 2006/0239640 A1 * | 10/2006 | Watanabe | H04N 5/4403 386/297 |
| 2007/0234395 A1 * | 10/2007 | Dureau | H04N 5/4401 725/135 |
| 2009/0059073 A1 * | 3/2009 | Cho | H04N 5/44591 348/565 |

(Continued)

*Primary Examiner* — Hoang-Vu A Nguyen-Ba
(74) *Attorney, Agent, or Firm* — Winston Hsu

(57) ABSTRACT

A video displaying method, applied to an electronic apparatus comprising a first display, comprising: (a) selecting a plurality of video contents from a plurality of candidate video contents; and (b) simultaneously displaying selected video contents selected in the step (a), respectively in sub-windows on the first display. Related video decoding methods are also disclosed.

12 Claims, 11 Drawing Sheets

(56) References Cited

U.S. PATENT DOCUMENTS

| | | | | |
|---|---|---|---|---|
| 2011/0119711 A1* | 5/2011 | Marshall | ............ | H04N 5/44591 |
| | | | | 725/41 |
| 2011/0249177 A1* | 10/2011 | Chen | .................. | H04N 21/2347 |
| | | | | 348/388.1 |
| 2013/0033642 A1* | 2/2013 | Wan | ....................... | H04N 19/39 |
| | | | | 348/495 |
| 2015/0237390 A1* | 8/2015 | Watters | .............. | H04N 21/4314 |
| | | | | 725/44 |

\* cited by examiner

VIDEO DISPLAYING METHOD AND VIDEO DECODING METHOD WHICH CAN OPERATE IN MULTIPLE DISPLAY MODE AND ELECTRONIC SYSTEM APPLYING THE METHOD

CROSS REFERENCE TO RELATED APPLICATIONS

This application claims the benefit of U.S. Provisional Application No. 62/103,739, filed on Jan. 15, 2015, and U.S. Provisional Application No. 62/194,812, filed on Jul. 20, 2015, the contents of which are incorporated herein by reference.

BACKGROUND

In a video streaming system, such as a TV system, multiple video contents (ex. TV programs or movies) are provided. For the convenience of users to select one video from a plural of offered videos, a video content preview function is provided.

For example, a video content list is provided, which comprises a plurality of video content indexes (ex. the title of a movie or a TV program). Once a video content is selected, its preview video content can be displayed in part or in full screen mode. Some related information associated with the selected video content, such as story lines or the introduction, may be shown on the same display.

However, in the related art video previewing method, only one video content can be reviewed per time, thus the user may need a lot of time to review all video contents.

SUMMARY

One objective of the present application is to provide a video displaying method that can simultaneously display more than one video content.

Another objective of the present application is to provide a video decoding method which can simultaneously generate different video contents.

Another objective of the present application is to provide an electronic system which can apply the video displaying method and/or the video decoding method provided by the present application.

Another embodiment of the present application discloses an electronic system comprising: a video controlling device, configured to receive video contents from a video content providing device, and configured to perform following steps: (a) selecting a plurality of video contents from a plurality of candidate video contents according to a control command; and (b) controlling a first display to simultaneously display selected video contents selected in the step (a), respectively in sub-windows on the first display.

One embodiment of the present application discloses a video decoding method, applied to a video decoding module comprising at least one video decoder, comprising: (a) applying the video decoding module to receive a first video stream for a first video content and a second video stream for a second video content; (b) decoding the first video stream and the second video stream if both the first video content and the second video content are to be displayed; and (c) decoding the first video stream and the second video stream if the first video content is to be displayed but the second video content is not to be displayed.

Another embodiment of the present application discloses an electronic system comprising: a video decoding module, comprising at least one video decoder; a video driving device, configured to control the video decoding module to perform following steps: (a) receiving a first video stream for a first video content and a second video stream for a second video content; (b) decoding the first video stream and the second video stream if both the first video content and the second video content are to be displayed; and (c) decoding the first video stream and the second video stream if the first video content is to be displayed but the second video content is not to be displayed.

One embodiment of the present application discloses a video decoding method, applied to a video decoding module comprising at least one video decoder, comprising: (a) applying the video decoding module to receive a first video stream for a first video content and a second video stream for a second video content; (b) decoding the first video stream and the second video stream while both the first video content and the second video content are to be displayed; and (c) decoding the first video stream but not decoding the second video stream, if the first video content is to be displayed but the second video content is not to be displayed.

Another embodiment of the present application discloses an electronic system comprising: a video decoding module, comprising at least one video decoder; a video driving device, configured to control the video decoding module to perform following steps: (a) receiving a first video stream for a first video content and a second video stream for a second video content; (b) decoding the first video stream and the second video stream while both the first video content and the second video content are to be displayed; and (c) decoding the first video stream but not decoding the second video stream, if the first video content is to be displayed but the second video content is not to be displayed.

In view of above-mentioned embodiments, the user can simultaneously review or watch several video content, thus the user may feel more convenient and can use less time to preview all video contents. Also, a related video decoding method is provided, thus the multiple video contents can be acquired without using complicated steps.

These and other objectives of the present invention will no doubt become obvious to those of ordinary skill in the art after reading the following detailed description of the preferred embodiment that is illustrated in the various FIGS. and drawings.

DETAILED DESCRIPTION

In following descriptions, video displaying methods according to embodiments of the present application are provided for explaining the present application. However, please note the following embodiments are not limited to be applied to the video preview function. Also, the following embodiments are not limited to be applied to a video streaming system. The following embodiments can be applied to any electronic system which can simultaneously display more than one video contents.

FIG. 1-FIG. 9 are schematic diagrams illustrating video displaying methods according to different embodiments of the present application.

Figure 1:
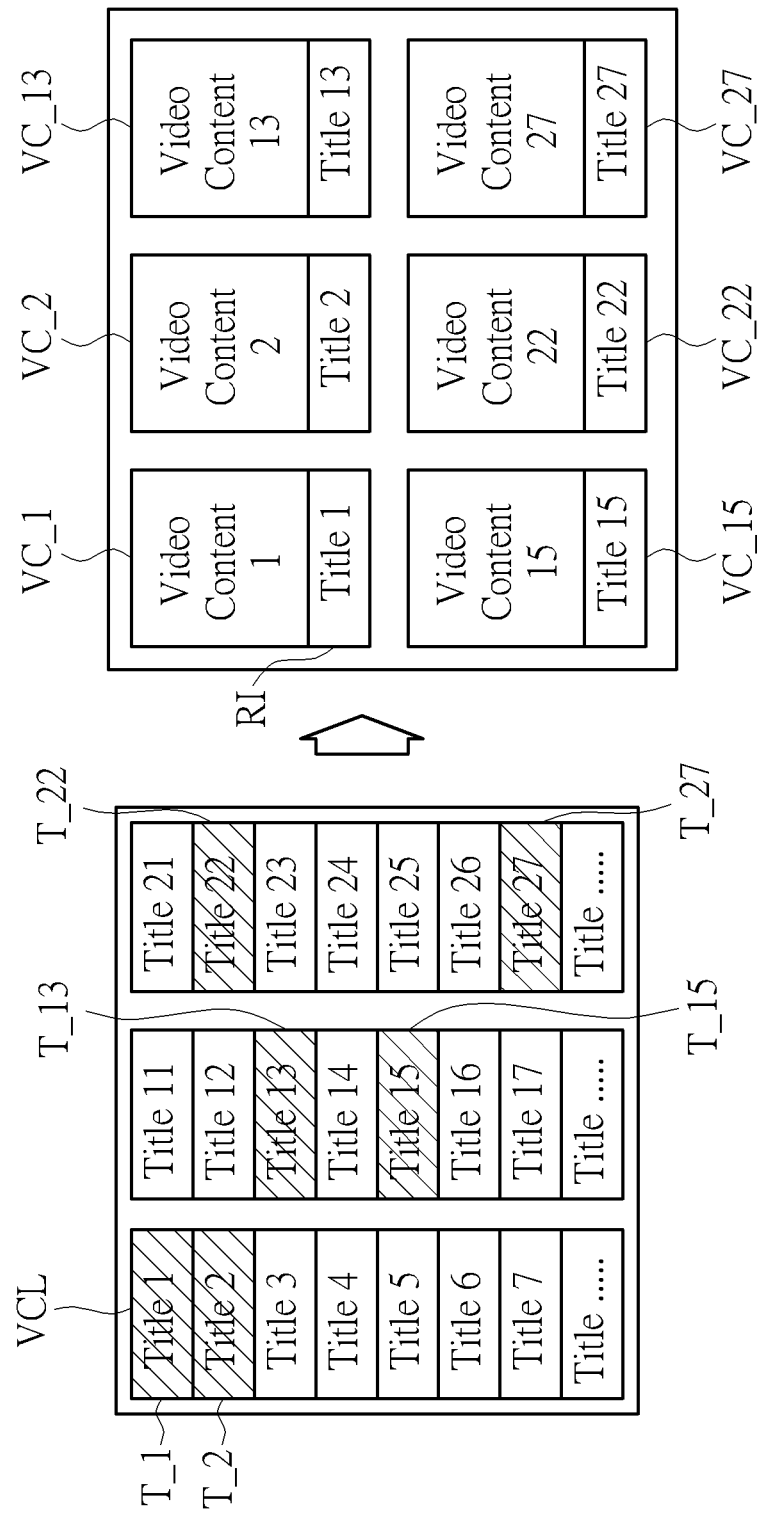
FIG. 1-FIG. 9 are schematic diagrams illustrating video displaying methods according to different embodiments of the present application.

In FIG. 1, a candidate video content list VCL is provided firstly, which comprises a plurality video content indexes (ex. the title of a movie or a TV program). A plurality of video contents are selected from the candidate video contents via tapping these video content indexes. However, the video displaying method provided by the present application is not limited to select video contents via the video content indexes illustrated in FIG. 1. For example, the video content indexes can respectively comprise one frame for each video content rather than the title.

The maximum number of the selected video contents can be determined by varieties of rules. In one embodiment, the maximum number of the selected video contents is a predetermined value, such as 4, or 2. In another embodiment, it is determined by a size of the display, to make sure each sub-window has enough resolution when displaying multiple sub-windows together at the same time. For example, each sub-window should maintain a minimum horizontal resolution of 704 and vertical resolution of 576. In another embodiment, it is determined by the number of available video decoders in the system that can decode the selected video contents simultaneously. When the number of selected contents reaches the allowed maximum, the system should response with information to disallow the user to select any more contents.

In yet another embodiment, the separation of a display into multiple sub-windows should follow a rule that each direction of the sub-window cannot be smaller than 1/K of the display's original size. K is an integer number, and the K used for horizontal and vertical directions can be different. In yet another embodiment, the maximum number is constrained by the total available bandwidth that can be used to stream the selected multiple video contents. The total required bandwidth indicated by the selected video contents should not be higher than the available bandwidth from server to the electronic system.

Figure 2:
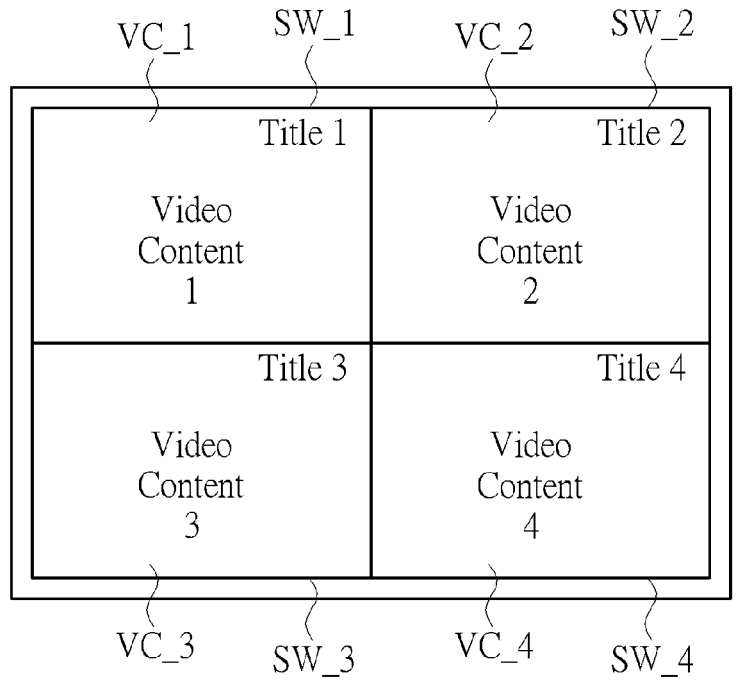

After a plurality of video contents are selected, the selected video contents are displayed simultaneously in sub-windows of the display, respectively. In the embodiment of FIG. 1, the video content 1 VC_1, the video content 2 VC_2, the video content 13 VC_13, the video content 15 VC_15, the video content 22 VC_22 and the video content 27 VC_27 are selected, and the video contents thereof are displayed. The order of the displayed video contents on the display can be based on the order of the titles from the list, or the order that those video contents are selected, or based on any other rules. Also, in one embodiment, when the selected video contents are displayed, the related information (such as the title or the duration) of each video content is put aside the corresponding video content. Please note, the related information can be displayed at any location. For example, in another embodiment, the related information of each video content is embedded in the corresponding video content, such as shown in FIG. 2.

When displaying the selected video contents on the display, each of the sub-windows that respectively displays one selected video content are provided. In one embodiment, the size of the sub-window is determined by the display size and the number of selected video contents. Take FIG. 2 for example, sub-windows SW_1, SW_2, SW_3 and SW_4 are provided to respectively display the video content 1 VC_1, the video content 2 VC_2, the video content 3 VC_3 and the video content 4 VC_4. In this embodiment, each sub-window occupies one-fourth area of the display.

Figure 3:
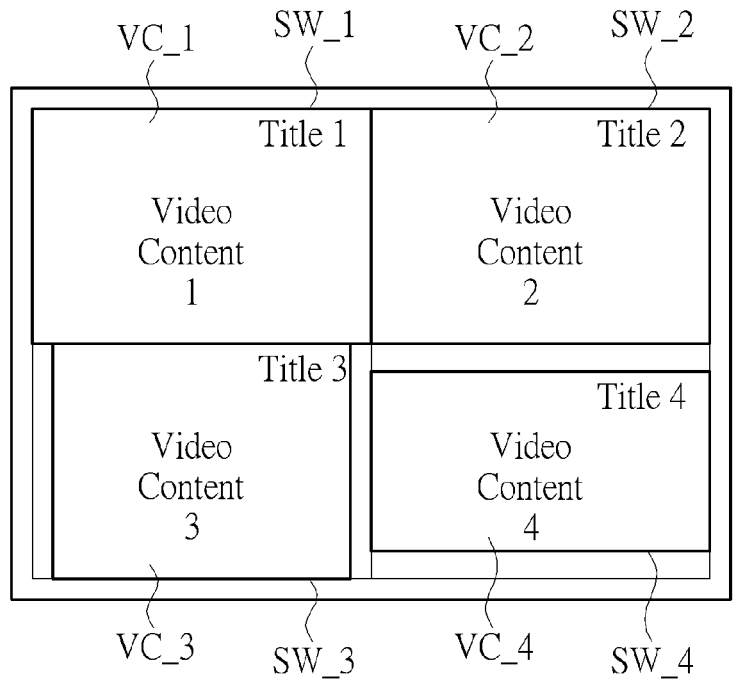

In one embodiment, the aspect ratio of each selected video content (ex. 16:9 or 4:3) can be changed. For example, via proper up/down sampling and filtering (not limited), the selected video content can fill up the given sub-window fully. For example, in the embodiment of FIG. 2, each selected video content fully fills up the corresponding sub-window. In another embodiment, the aspect ratio for each selected video content is not changed. For example, the selected video content fills up one direction fully in the sub-window while the other direction does not fill up the sub-window. As illustrated in FIG. 3, the video content 3 VC_3 fills up fully only the vertical direction and the video content 4 VC_4 fills up fully only the horizontal direction. In another embodiment, the aspect ratio for each selected video content does not change and the selected video content fill up the display window in both directions. In such case, at least one direction for the selected video content maybe extended and/or cut.

Figure 4:
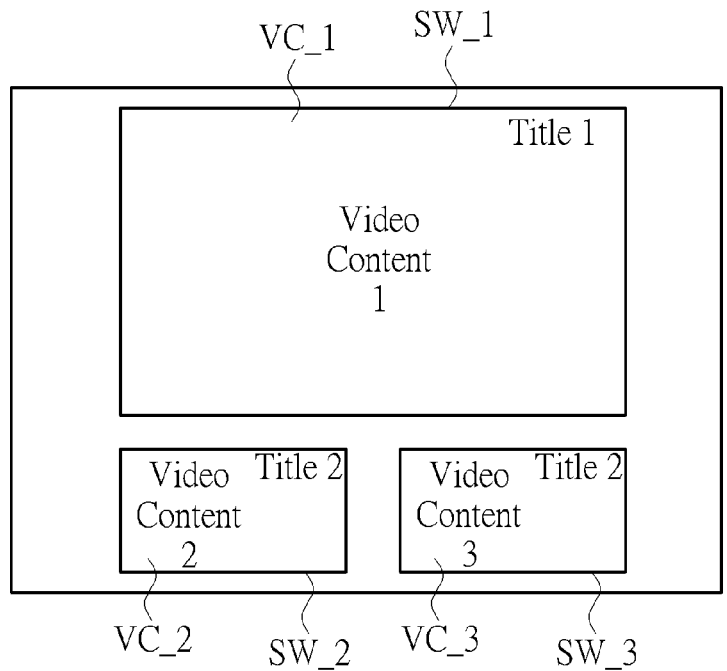
Figure 5:
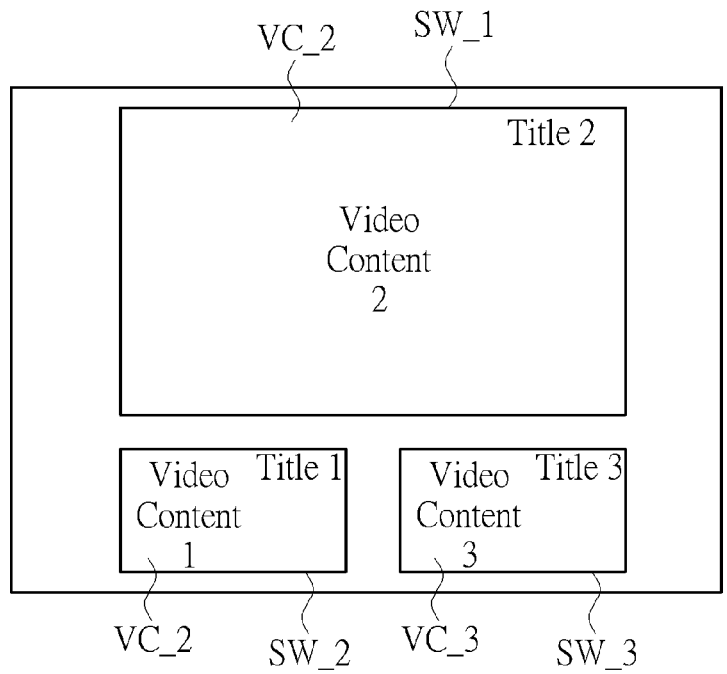

In another embodiment, when displaying the selected video contents on one display, the sizes for each sub-window can be different. As shown in the embodiment of FIG. 4, three selected video contents are simultaneously displayed, and the sub-window SW_1 is larger than other sub-windows SW_2, SW_3.

In one embodiment, the sizes of the sub-windows for displaying the selected video content can be swapped via a swap command. For more detail, the embodiment illustrated in FIG. 4 displays the video content 1 VC_1 via the large sub-window SW_1, and display the video content 2 VC_2 via the small sub-window SW_2. After receiving a swap command, the situation in FIG. 4 is changed to the situation in FIG. 5, which displays the video content 1 VC_1 via the small sub-window SW_2, and display the video content 2 VC_2 via the large sub-window SW_1.

The swap command can be any kind of command (ex. tap, click, gesture, voice) or the combination thereof. In one embodiment, when the user clicks on the video content in a small sub-window, e.g. video content 2 VC_2 or video content 3 VC_3 in the embodiment of FIG. 4, the clicked video content is moved to be displayed in the large sub-window while the video content which was displayed in the large sub-window is moved to be displayed in the small display window. Briefly, in the embodiment of FIG. 4, if the user clicks on the video content 2 VC_2 in FIG. 4, the sub-windows of the video content 2 VC_2 and the video content 1 VC_1 are swapped.

Moreover, in other embodiments, one sub-window can be swapped with multiple sub-windows. For example, in the FIG. 4, the large sub-window SW_1 comprising the video content 1 VC_1 can be swapped with the small sub-window SW_2 comprising the video content 2 VC_2 and the small sub-window SW_3 comprising the video content 3 VC_3. Thus, the video content 1 VC_1 in the large sub-window SW_1 is placed at the bottom part, and the video content 2 VC_2 in the small sub-window SW_2 and the video content 3 VC_3 in the small sub-window SW_3 are placed at upper part (not shown).

Figure 6:
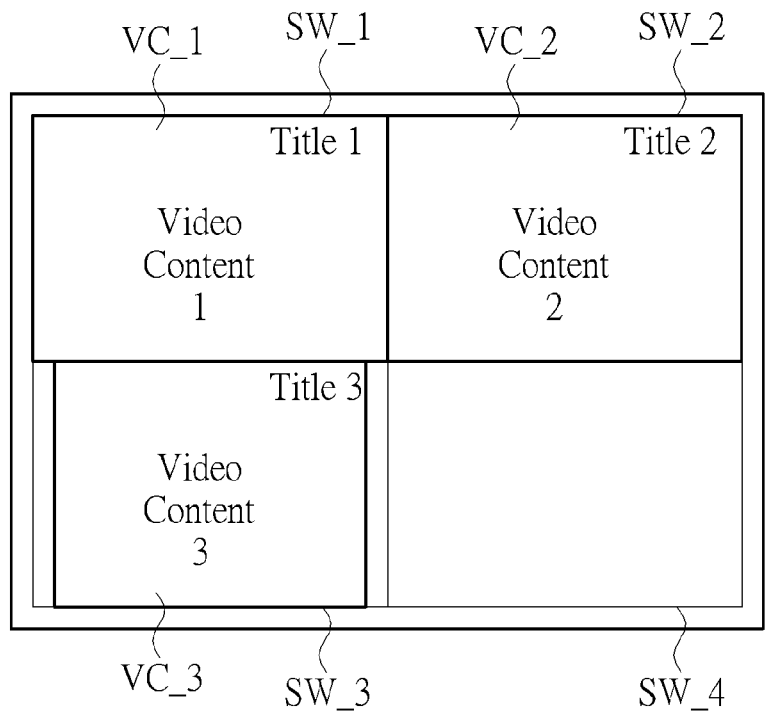

The number of sub-windows is not limited to be the same as a number of the selected video contents. In one embodiment, a number of the sub-windows is larger than a number of the selected video contents. As illustrated in the embodiment of FIG. 6, the number of selected video contents is 3 and the number of the sub-windows is 4, and the sub-window SW_4 is empty.

In another embodiment, the number of the sub-windows is a fixed value. The fixed number can be a number that is always used, or the maximum number of video contents that can be displayed simultaneously. No matter how many video contents are actually selected, as long as the number of selected video contents does not exceed the maximum number, the system can operate via using this fixed setup.

In another embodiment, the number of the sub-windows is associated with the number of the selected video contents. For example, in one embodiment, the number N for the number of sub-windows used on the display for displaying selected video contents is selected from a pre-defined set $\{N(1), N(2), N(3), \ldots\}$. $N(i)$ in this set can be any integer numbers, but in an increasing order. For example, $N(1)=1$, $N(2)=2$, $N(3)=4$, $N(4)=6$. When the number of selected video contents M satisfies $N(i)<M<=N(i+1)$, $N(i+1)$ should be used to allocate the number of locations on the screen. In the above case, if 3 video contents are selected, then the window location setup with $N(3)=4$ should be used, one of the four windows will be empty.

It will be appreciated that the increasing order is not limited to the above-mentioned embodiment. In one embodiment, the increasing order is $N(i)=i*i$, where in the i is a positive integer.

Figure 7:
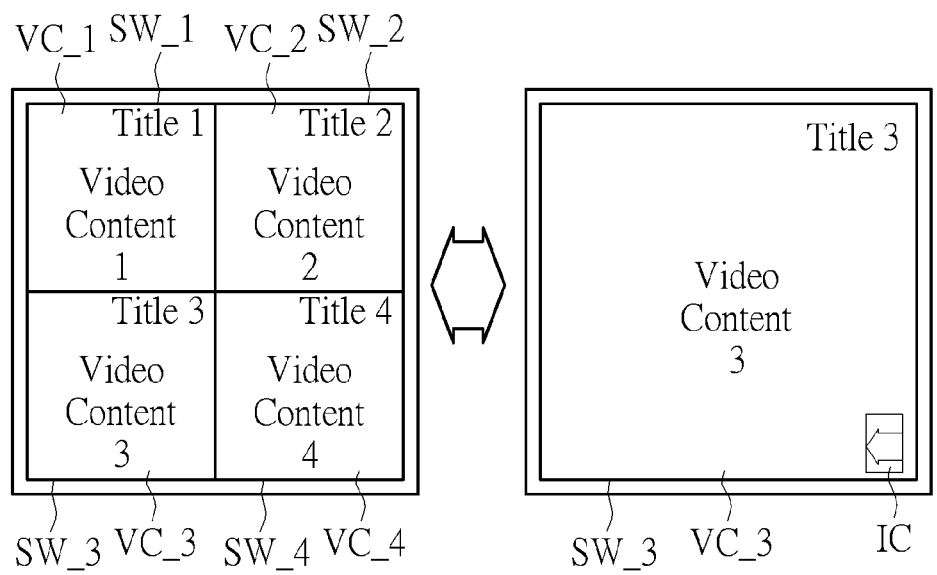
Figure 8:
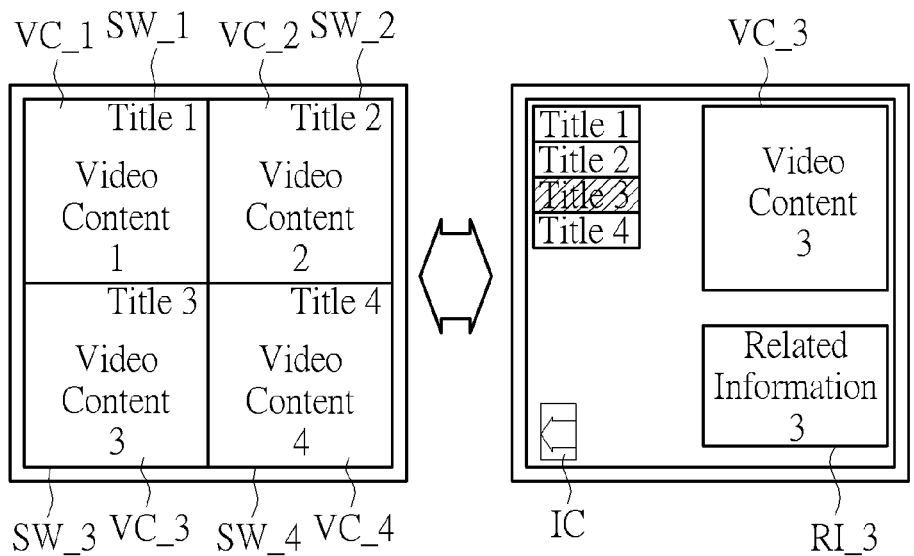

In one embodiment, the video displaying method can be switched between a single display mode and a multiple display mode. In the single display mode, only one video content can be selected and displayed. In the multiple display mode, more than one video content can be selected and then displayed. In the embodiment of FIG. 7, the video content 1 VC_1, the video content 2 VC_2, the video content 3 VC_3 and the video content 4 VC_4 are selected and displayed in the multiple display mode. Also, the video content 3 VC_3 is selected from the video contents VC_1-VC_4 and displayed in the single display mode. In the single display mode, the video content 3 VC_3 can be displayed in a full screen mode, as illustrated in FIG. 7. Also, the video content 3 VC_3 can be displayed in a partial screen mode with related information 3 RI_3, as illustrated in the embodiment of FIG. 8.

The above-mentioned embodiments depict the operation for switching from the multiple display mode to the single display mode. In another embodiment, the video displaying method can be switched from the single display mode to the multiple display mode. Please refer to FIG. 7 and FIG. 8 again. In FIG. 7 and FIG. 8, a back icon IC is provided. The single display mode is switched back to the multiple display mode if the back icon IC is triggered. Please note other trigger methods can be applied to trigger the operation of switching from the single display mode to the multiple display mode. For example, a specific button, a specific gesture, or a specific voice command can be applied to trigger the switch operation.

Figure 9:
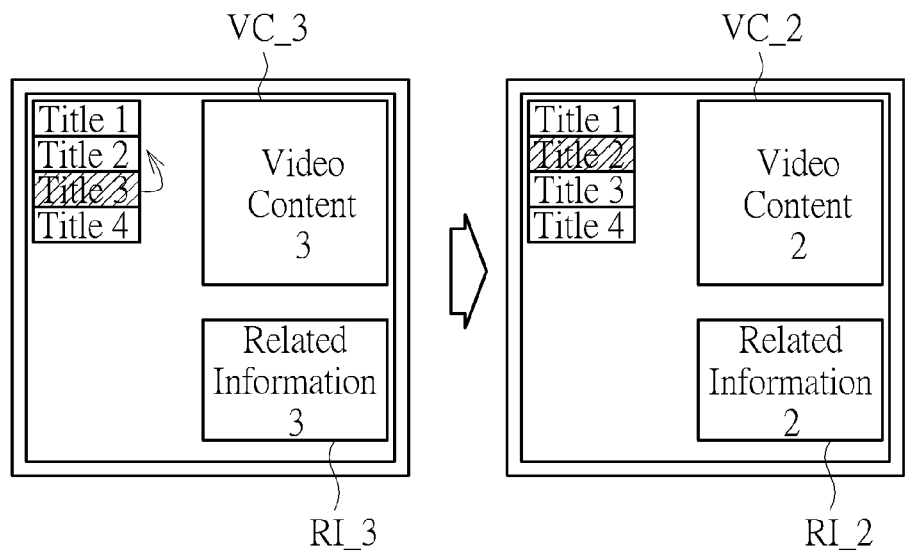

In one embodiment, in the single display mode, the displayed video content can be switched among the selected video contents. In the embodiment of FIG. 9, the currently displayed video content is the video content 3 VC_3, and the video content 1 VC_1, the video content 2 VC_2, the video content 3 VC_3, and the video content 4 VC_4 are video contents selected in multiple display mode. As illustrated in FIG. 9, it can be switched from the video content 3 VC_3 to the video content 2 VC_2 directly.

In the above-mentioned embodiments, a single display is provided as an example for explaining. However, another display can be further included for displaying video contents. For example, in the embodiment of FIG. 2, four video contents are selected for simultaneously displayed. The video content 1 VC_1, the video content 2 VC_2 are simultaneously displayed on one display. Also, the video content 3 VC_3, the video content 4 VC_4 are simultaneously displayed on another display. Other embodiments can be applied to such structure as well, but are omitted for brevity here.

Figure 10:
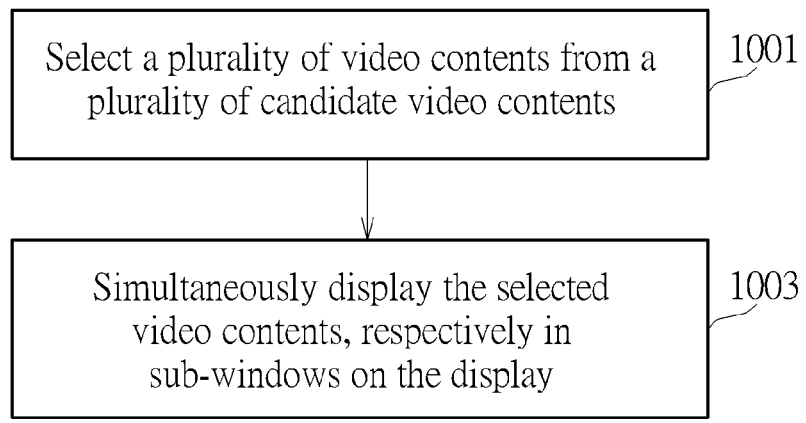
FIG. 10 is a flow chart briefly illustrating steps for a video displaying method according to one embodiment of the present application.

The above-mentioned embodiments can be summarized in FIG. 10, which is a flow chart briefly illustrating steps for a video displaying method according to one embodiment of the present application. FIG. 10 comprises following steps:

Step 1001

Select a plurality of video contents from a plurality of candidate video contents. Take FIG. 1 for example, candidate video contents are video contents listed in the candidate video content list VCL. The selected video contents are video contents VC_1, VC_2, VC_13, VC_15, VC_22, and VC_27.

Step 1003

Simultaneously display the selected video contents, respectively in sub-windows on the display.

Figure 11:
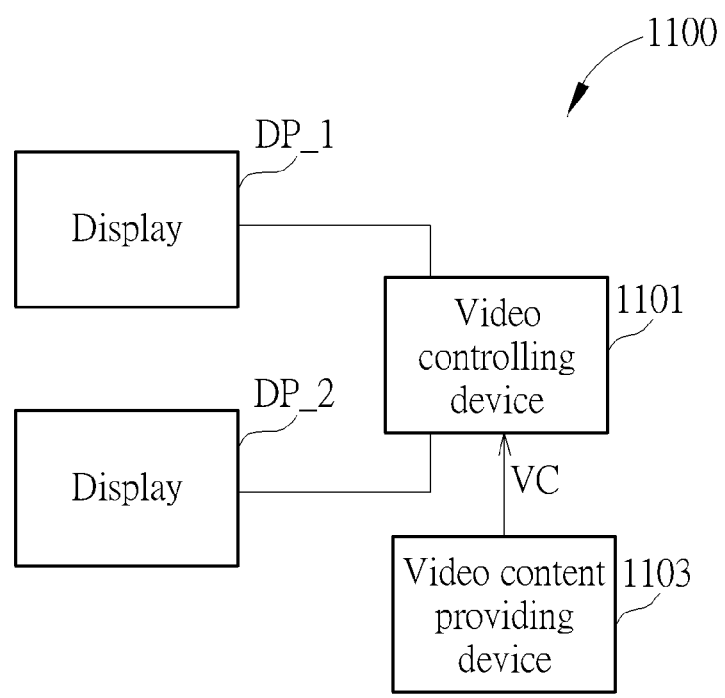
FIG. 11 is a block diagram illustrating an electronic system applying above-mentioned video displaying method.
Figure 12:
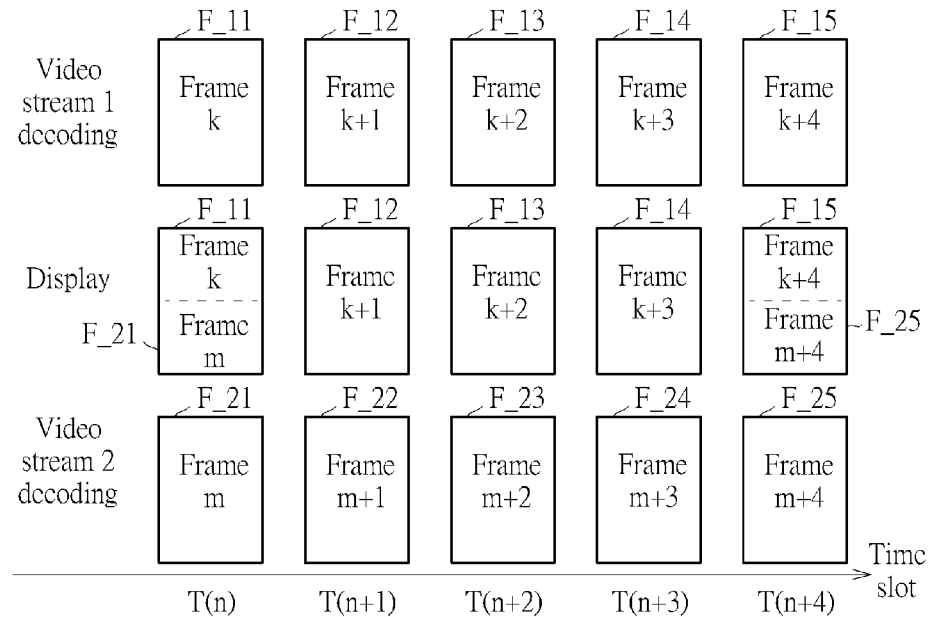
FIG. 12-FIG. 15 are schematic diagrams illustrating video decoding methods according to different embodiments of the present application.

FIG. 11 is a block diagram illustrating an electronic system applying above-mentioned video displaying method. As illustrated in FIG. 11, the electronic system 1100 comprises a video displaying device 1101, a video content providing device 1103 and at least one display (in this embodiment, two displays DP_1 and DP_2, but not limited). The electronic system can be a video streaming system such as a TV system, or any system that can simultaneously display video contents such as a computer or a mobile phone. The video content providing device 1103 is configured to provide video content. Also, the video displaying device 1101 receives the video content VC and controls the display DP_1, DP_2 to display the video content VC.

Please note, the electronic system 1100 can comprise only one display or more than two displays. The video content providing device 1103 can be, for example, a video decoder for decoding video streams from a remote server, or a storage device pre-storing the video contents. The video controlling device 1101 can control the displays DP_1 and DP_2 to operate in the single display mode or the multiple display mode according to at least control command, as above-mentioned embodiments. The control command can be, for example, the operations for selecting video content index as shown in FIG. 1, or the operation for triggering the back icon IC in FIG. 8, but not limited. The video controlling device 1101 and the video content providing device 1103 can be a hardware (ex. a circuit) or a hardware with software (ex. a control unit). Other detail steps for the electronic system 1200 can be acquired in view of above-mentioned embodiments, thus are omitted for brevity here.

Following embodiments are provided for explaining video decoding methods according to embodiments of the present application. In following embodiments, video decoding methods which can be, but not limited to, applied to above-mentioned video displaying methods.

FIG. 12-FIG. 15 are schematic diagrams illustrating video decoding methods according to different embodiments of the present application. In following embodiments, a video decoding module is applied to decode video streams, which can comprise only one video decoder or more than one video decoder. For example, a pipeline video decoder can be used to decode multiple video streams simultaneously. In another example, more than one video decoder is provided, each of which supports decoding of one single video stream. Also, the combination of previous two types of video decoders can be applied to the present application.

As above-mentioned, the maximum number for the selected video contents can be determined by the maximum bandwidth, if the electronic system is a video streaming system. In such case, if multiple video contents are selected for simultaneously displaying, requests of the video streams corresponding to the selected video contents are sent to the server side for streaming them to the electronic system for decoding and displaying. According to the requested total bandwidth, and the available maximum bandwidth, the server will provide the video streams as requested or send feedback to the electronic system that the number of selected video contents is over the limit.

In one embodiment, if two selected video contents are simultaneously displayed and then one of the selected video contents is selected to be displayed in the single display mode, the decoding process for other selected video contents can keep going on. In this case when switching from single display mode back to multiple display mode, all the video contents are still playing without interruption. Please refer to FIG. 12, in this embodiment the video content 1 and the video content 2 are selected for simultaneously displaying, thus the frame F_11 of the video steam 1 corresponding to the video content 1 is decoded and displayed and the frame F_21 of the video steam 2 corresponding to the video content 2 is decoded and displayed. Then the video content 1 is selected be displayed in the single display mode (frames F_12-F_14). In such case, the decoding for the video stream 2 still keeps going (frames F_22-F_24). After the electronic system is switched back to the multiple display mode, the frame F_15 of the video stream 1 and the frame F_25 of the video stream 2 are simultaneously displayed.

In one embodiment, the frames displayed in the single display mode and the frames displayed in the multiple display mode compromising different frame characteristics, for example, frame resolution or frame quality. In the embodiment illustrated in FIG. 13, frames displayed in the single display mode have a higher frame resolution than the frames displayed in the multiple display mode. For more detail, frames F_11 and F_15 for the video stream 1 and frames F_21 and F_25 for the video stream 2 are displayed in the multiple display mode, thus have a low frame resolution. On the opposite, frames F_12, F_13 and F_14 for the video stream 1 are displayed in the single display mode thus have a high resolution. Please note, frames F_22, F_23 and F_24 for the video stream 2 are not displayed, thus the frame resolution thereof can be either high or low.

Figure 13:
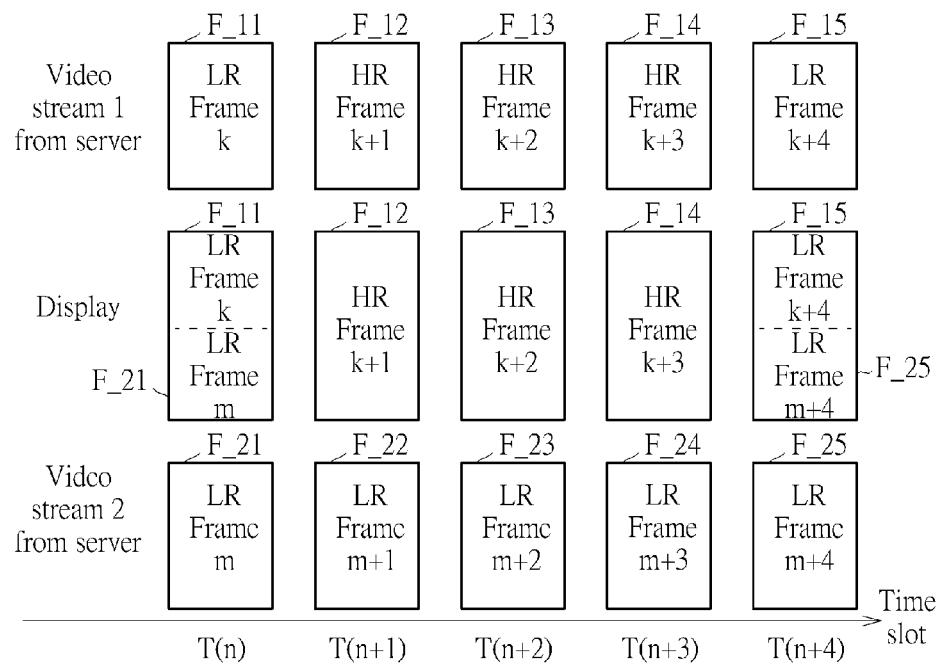
Figure 14:
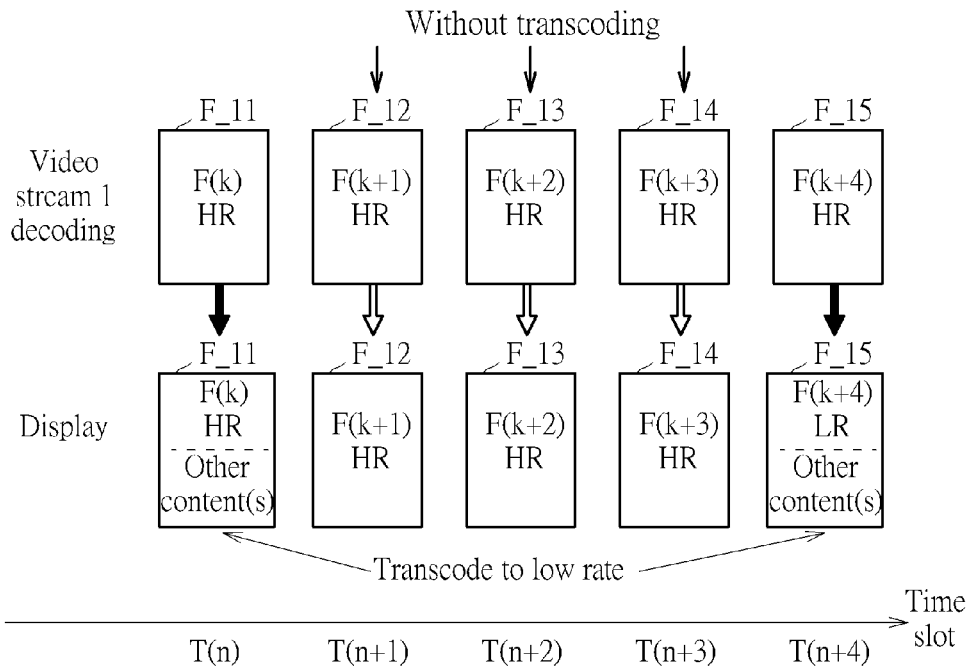

The frames with different resolutions can be provided by a variety of methods. In one embodiment, as illustrated in FIG. 13, a remote server has two video streams with different frame resolutions for the same video content. The video stream decoded in the multiple display mode is different from the one used in the single display mode. In one embodiment, the remote server has two video streams at different bitrates for the same video content. The video stream decoded in the multiple display mode is different from the one used in single display mode. In another embodiment, as illustrated in FIG. 14, a local gateway enabled transcoding system can response to the request for moving into the multiple display mode or the single display mode. The original incoming video stream for one video content is transcoded into some other video streams containing the same video content but suitable for viewing in the single or multiple display mode. That is, original incoming frames are transcoded in to frames comprising different frame characteristics, for example, frames F_11 and F_15. The encoding module that operates in the multiple display mode only needs to decode the transcoded video stream for one video content, but not the original video stream.

Figure 15:
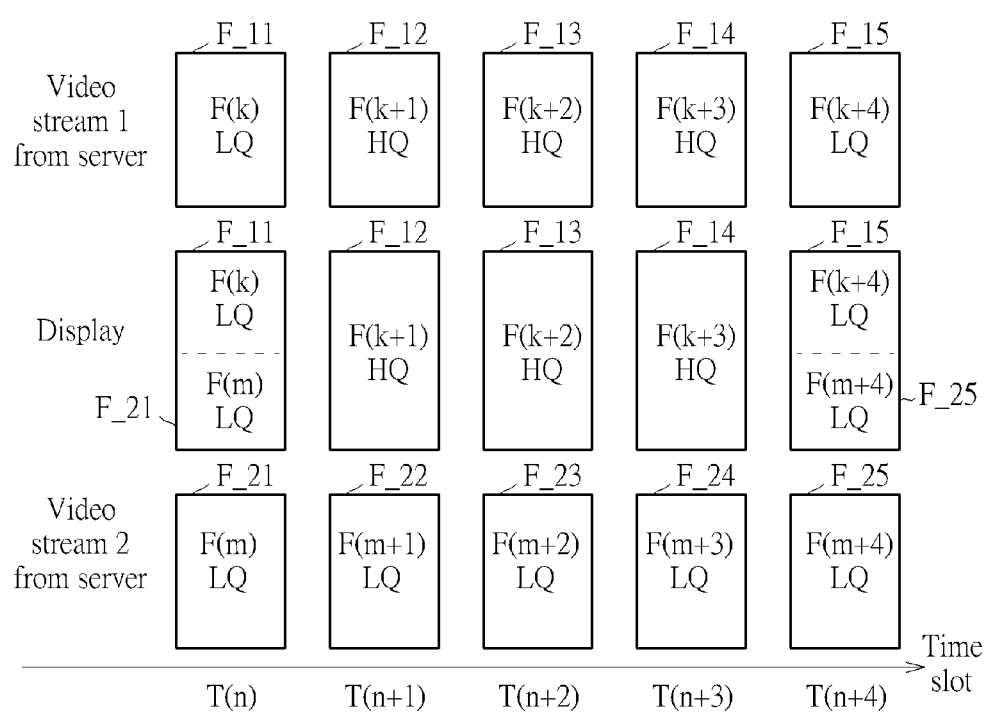

In the embodiment illustrated in FIG. 15, frames displayed in the single display mode have a higher frame quality than the frames displayed in the multiple display mode. For more detail, frames F_11 and F_15 for the video stream 1 and frames F_21 and F_25 for the video stream 2 are displayed in the multiple display mode, thus have a low frame quality. On the opposite, frames F_12, F_13 and F_14 for the video stream 1 are displayed in the single display mode thus have a high quality. Please note, frames F_22, F_23 and F_24 for the video stream 2 are not displayed, thus the frame resolution thereof can be either high or low.

The frames with different qualities can be provided by a variety of methods. In one embodiment, the video stream consists of a base layer part and one or several enhancement layer parts. When decoding the base layer only, the frame quality may be low (e.g. lower spatial resolution, etc). The decoding of enhancement layer(s) are based on the information from the previous base layer while the base layer fraction of this video stream can be decoded independently without decoding all of the video stream. During the multiple display mode, only the base layer is decoded and displayed, thus corresponding frames have a lower quality. When switching to single display mode, in addition to the base layer, the enhancement layer(s) is also decoded to improve the frame quality.

Figure 16:
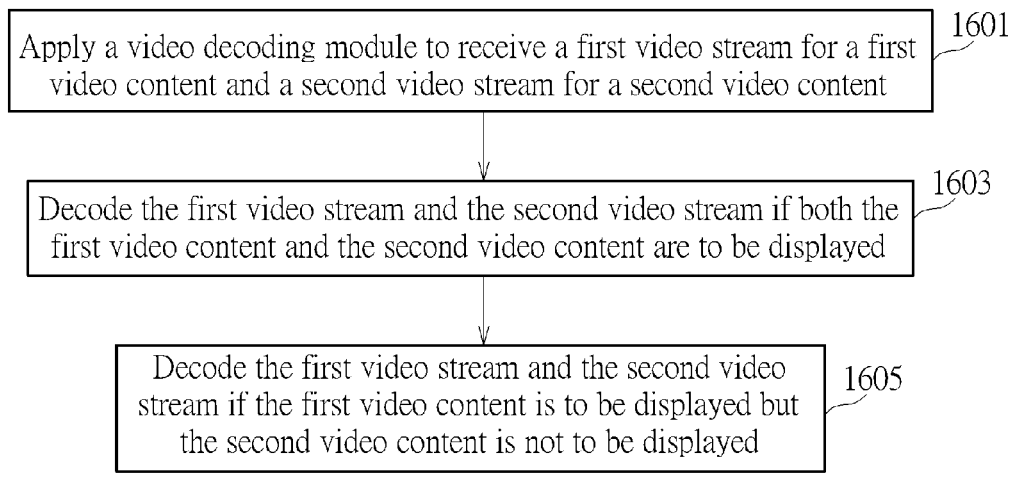
FIG. 16 is a flow chart briefly illustrating steps for a video decoding method corresponding to the embodiments illustrated in FIG. 11-FIG. 14.

FIG. 16 is a flow chart briefly illustrating steps for a video decoding method corresponding to the embodiments illustrated in FIG. 11-FIG. 14. FIG. 16 comprises following steps:

Step 1601

Apply a video decoding module to receive a first video stream (ex. video stream 1) for a first video content and a second video stream for a second video content (ex. video stream 2).

Step 1603

Decode the first video stream and the second video stream if both the first video content and the second video content are to be displayed.

Step 1605

Decode the first video stream and the second video stream if the first video content is to be displayed but the second video content is not to be displayed.

Other detail steps can be acquired in view of above-mentioned embodiments, thus are omitted for brevity here.

Figure 17:
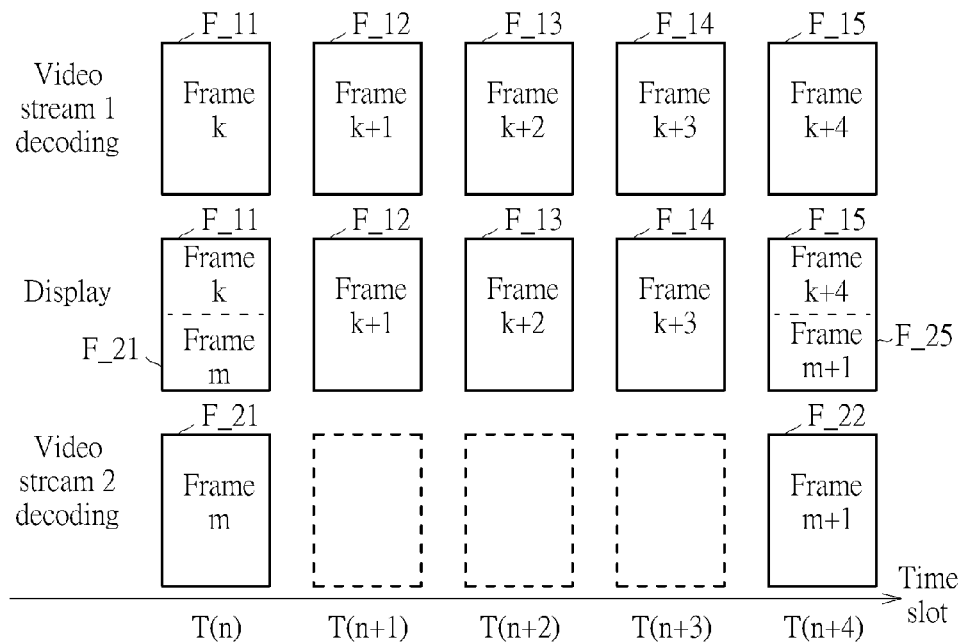
FIG. 17, FIG. 18A and FIG. 18B are schematic diagrams illustrating video decoding methods according to different embodiments of the present application.

In one embodiment, decoding for all other video contents not displayed are stopped while in the single display mode. In this case when switching from single display mode back to multiple display mode, all the video contents (except the one that was selected) are resumed playing from where they were paused. As shown in FIG. 17, at the time slot T(n), the video decoding method operates in the multiple display mode, thus the frame F_11 and the frame F_21 are decoded. At the time slot T(n+1)-T(n+3), the video decoding method operates in the single display mode and the video content for video stream 1 is displayed, thus the decoding for the video stream 2 is paused. At the time slot (n+4), the video decoding method is switched back to the multiple display mode, and the decoding for the video stream 2 is resumed. In this embodiment, the frame F_22 is a next frame of the frame F_21.

Figure 18A:
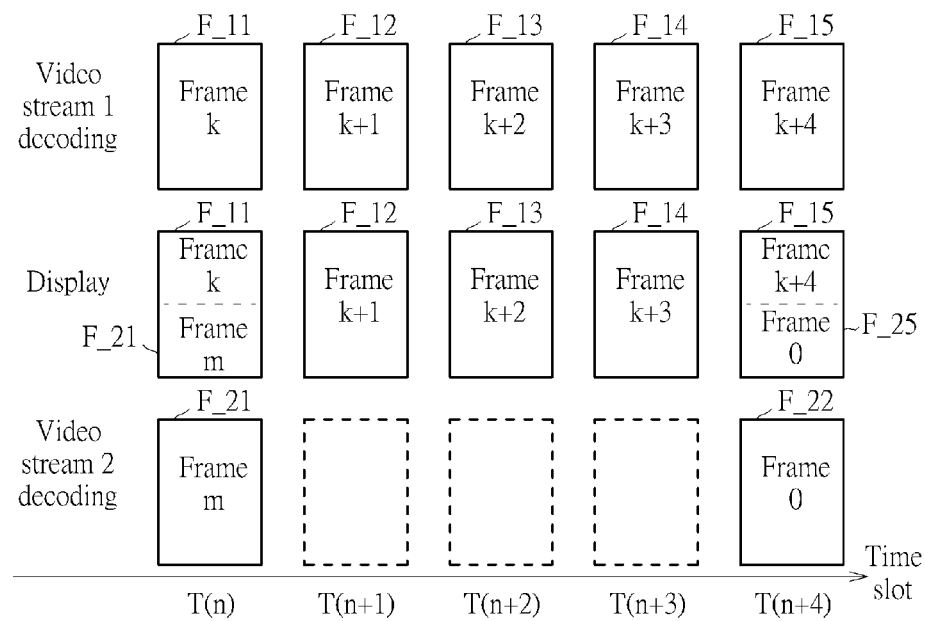

Please note, the frame, which is one frame of the video stream not decoded in the single display mode (ex. video stream 2 in FIG. 18A) and is at the time slot back from the single mode to the multiple mode (ex. T(n+4) in FIG. 17) can be any other frame besides a next frame of the frame at a previous time slot that the video decoding method operates in the multiple display mode (ex. T(n) in FIG. 17). As illustrated in FIG. 18A, the frame F_22 is a beginning frame of the video stream 2 rather than a next frame of the frame F_21.

Figure 18B:
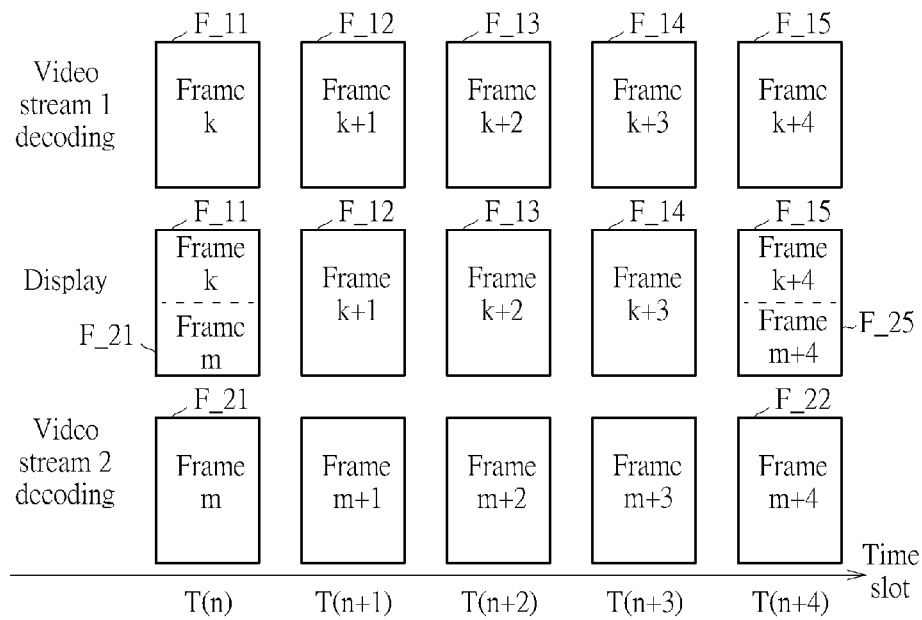

In another embodiment, decoding for the video contents that are not being displayed continues while in the single display mode. In this case when switching from single display mode back to multiple display mode, all video contents resume playing at the same display time. As shown in FIG. 18B, at the time slot T(n), the video decoding method operates in the multiple display mode, thus the frame F_11 and the frame F_21 are decoded. At the time slot T(n+1)-T(n+3), despite that the video displaying mode operates in the single display mode, the video decoding method operates in multiple decoding mode and thus all video contents are continuously decoded although only video stream 1 is displayed. At the time slot T(n+4), the video display method is switched back to the multiple display mode, the time of frame F_22 is aligned with the time of frame F_11.

Figure 19:
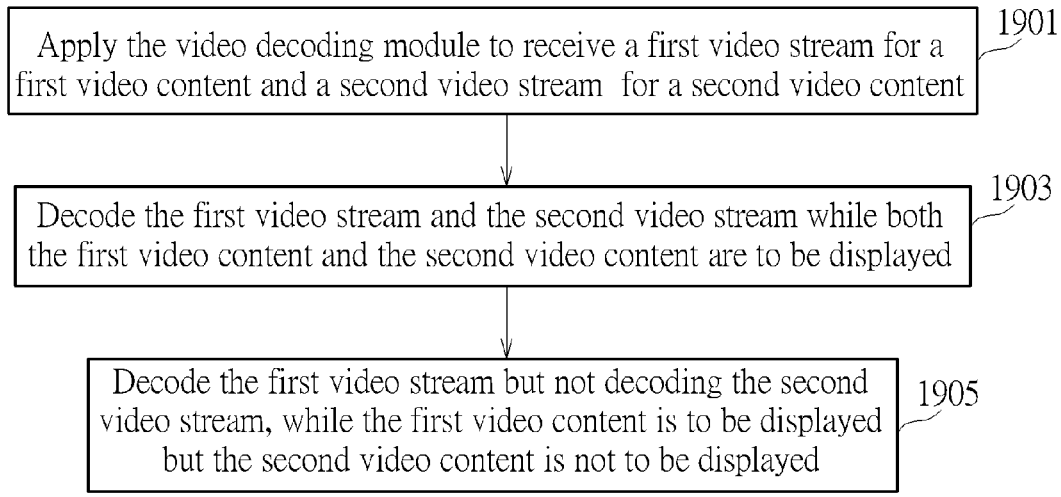
FIG. 19 is a flow chart briefly illustrating steps for a video decoding method corresponding to the embodiments illustrated in FIG. 17, FIG. 18A and FIG. 18B.

FIG. 19 is a flow chart briefly illustrating steps for a video decoding method corresponding to the embodiments illustrated in FIG. 17, FIG. 18A and FIG. 18B. FIG. 19 comprises following steps:

Step 1901

Apply the video decoding module to receive a first video stream (ex. video stream 1) for a first video content and a second video stream (ex. video stream 2) for a second video content.

Step 1903

Decode the first video stream and the second video stream while both the first video content and the second video content are to be displayed.

Step 1905

Decode the first video stream but not decoding the second video stream, while the first video content is to be displayed but the second video content is not to be displayed.

Other detail steps can be acquired in view of above-mentioned embodiments, thus are omitted for brevity here.

Figure 20:
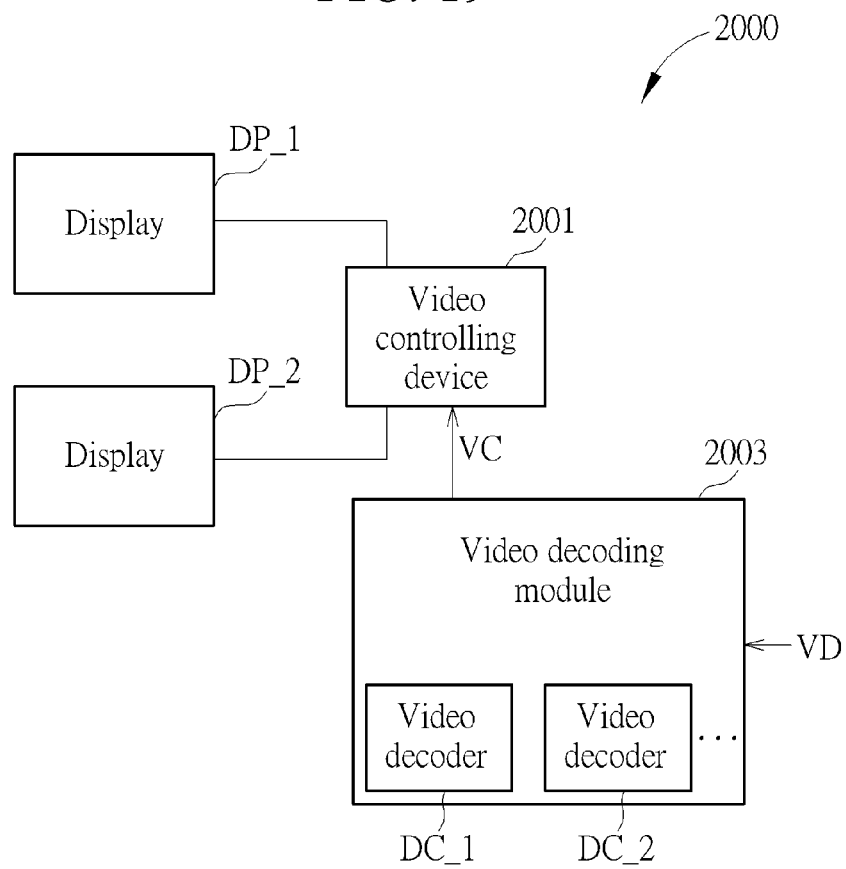
FIG. 20 is a block diagram illustrating an electronic system applying above-mentioned video decoding method.

FIG. 20 is a block diagram illustrating an electronic system applying above-mentioned video decoding method. As illustrated in FIG. 20, the electronic system 2000 comprises a video displaying device 2001, a video decoding module 2003, at least one display (in this embodiment, two displays DP_1 and DP_2, but not limited), and at least one video decoder (in this embodiment, two video decoders DC_1 and DC_2, but not limited). The electronic system 2000 can be a video streaming system such as a TV system. The video decoding module 2003 receives video data VD (ex. video stream from a remote server) and generates the video content to the video displaying device 2001, according to at least one above-mentioned embodiment. Also, the video displaying device 2001 receives the video content VC and controls the display DP_1, DP_2 to display the video content VC.

Please note, the electronic system 2000 can comprise only one display or more than one display. In one embodiment, the video controlling device 2001 can control the displays DP_1 and DP_2 to operate in the above-mentioned single display mode or the multiple display mode according to at least one control command. The control command can be, for example, the operations for selecting video content index as shown in FIG. 1, or the operation for triggering the back icon IC in FIG. 8, but not limited. The video controlling device 2001 and the video decoding module 2003 can be a hardware (ex. a circuit) or a hardware with software (ex. a control unit). Other detail steps for the electronic system 2000 can be acquired in view of above-mentioned embodiments, thus are omitted for brevity here.

In view of above-mentioned embodiments, the user can simultaneously review or watch several video content, thus the user may feel more convenient and can use less time to preview all video contents. Also, a related video decoding method is provided, thus the multiple video contents can be acquired without using complicated steps.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoding method, applied to a video decoding module comprising at least one video decoder, comprising:
   (a) applying the video decoding module to receive a first video stream for a first video content and a second video stream for a second video content;
   (b) decoding the first video stream and the second video stream if both the first video content and the second video content are to be displayed; and
   (c) decoding the first video stream and the second video stream if the first video content is to be displayed but the second video content is not to be displayed;
   wherein the step (a) comprises:
   receiving a first frame and a second frame of the first video stream and receives a first frame and a second frame of the second video stream;
   wherein the second frame of the first video stream has a frame resolution higher than a frame resolution for the first frame of the first video content, or the second frame of the first video content has a video quality higher than a video quality for the first frame of the first video content;
   wherein the step (b) comprises:
   (b1) decoding the first frame of the first video stream and the first frame of the second video stream; and
   (b2) simultaneously displaying the first frame of the first video content and the first frame of the second video content;
   wherein the step (c) comprises:
   (c1) decoding the second frame of the first video content and the second frame of the second video content;
   (c2) displaying the second frame of the first video content; and
   (c3) not displaying the second frame of the second video content.

2. An electronic system, comprising:
   a video decoding module, comprising at least one video decoder;

a video driving device, configured to control the video decoding module to perform following steps:

(a) receiving a first video stream for a first video content and a second video stream for a second video content;

(b) decoding the first video stream and the second video stream if both the first video content and the second video content are to be displayed; and (c) decoding the first video stream and the second video stream if the first video content is to be displayed but the second video content is not to be displayed, wherein the step (a) comprises:

receiving a first frame and a second frame of the first video stream and receives a first frame and a second frame of the second video stream;

wherein the second frame of the first video stream has a frame resolution higher than a frame resolution for the first frame of the first video content, or the second frame of the first video content has a video quality higher than a video quality for the first frame of the first video content;

wherein the step (b) comprises:

(b1) decoding the first frame of the first video stream and the first frame of the second video stream; and (b2) simultaneously displaying the first frame of the first video content and the first frame of the second video content;

wherein the step (c) comprises:

(c1) decoding the second frame of the first video content and the second frame of the second video content;

(c2) displaying the second frame of the first video content; and (c3) not displaying the second frame of the second video content.

3. A video decoding method, applied to a video decoding module comprising at least one video decoder, comprising:

(a) applying the video decoding module to receive a first video stream for a first video content and a second video stream for a second video content;

(b) decoding the first video stream and the second video stream while both the first video content and the second video content are to be displayed; and (c) decoding the first video stream but not decoding the second video stream, if the first video content is to be displayed but the second video content is not to be displayed;

wherein the first video content and the second video content are simultaneously displayed in a multiple display mode, or wherein the first video content is displayed but the second video content is not displayed in a single display mode, wherein a frame of the second video stream, which is at a time slot that the video decoding method is switched from the single display mode to the multiple display mode, is a next frame of a frame of the second video stream, or is a beginning frame of the second video stream;

wherein the frame of the second video stream is at a time slot that the video decoding method is in the multiple display mode before the single display mode.

4. The video decoding method of claim 3:

wherein the step (b) comprises:

(b1) decoding a first frame of the first video stream and a first frame of the second video stream, and simultaneously displaying the first frame of the first video stream and the first frame of the second video stream;

(b2) decoding a second frame of the first video stream and a second frame of the second video stream, and simultaneously displaying the second frame of the first video stream and the second frame of the second video stream;

wherein the second frame of the second video stream is a frame after the first frame of the second video stream wherein the step (c) comprises following steps after the step (b1) and before the step (b2):

decoding the first video stream but not decoding the second video stream while at least one frame of the first video content is displayed but the second video content is not displayed.

5. The video decoding method of claim 3:

wherein the step (b) comprises:

(b1) decoding a first frame of the first video stream and a first frame of the second video stream, and simultaneously displaying the first frame of the first video stream and the first frame of the second video stream;

(b2) decoding a second frame of the first video stream and a second frame of the second video stream, and simultaneously displaying the second frame of the first video stream and the second frame of the second video stream;

wherein the second frame of the second video stream is a beginning frame of the second video stream;

wherein the step (c) comprises following steps after the step (b1) and before the step (b2):

decoding the first video stream but not decoding the second video stream while at least one frame of the first video content is displayed but the second video content is not displayed.

6. An electronic system, comprising:

a video decoding module, comprising at least one video decoder;

a video driving device, configured to control the video decoding module to perform following steps:

(a) receiving a first video stream for a first video content and a second video stream for a second video content;

(b) decoding the first video stream and the second video stream while both the first video content and the second video content are to be displayed; and (c) decoding the first video stream but not decoding the second video stream, if the first video content is to be displayed but the second video content is not to be displayed;

wherein the first video content and the second video content are simultaneously displayed in a multiple display mode, or wherein the first video content is displayed but the second video content is not displayed in a single display mode, wherein a frame of the second video stream, which is at a time slot that the video decoding method is switched from the single display mode to the multiple display mode, is a next frame of a frame of the second video stream, or is a beginning frame of the second video stream;

wherein the frame of the second video stream is at a time slot that the video decoding method is in the multiple display mode before the single display mode.

7. The electronic system of claim 6:

wherein the step (b) comprises:

(b1) decoding a first frame of the first video stream and a first frame of the second video stream, and simultaneously displaying the first frame of the first video stream and the first frame of the second video stream;

(b2) decoding a second frame of the first video stream and a second frame of the second video stream, and simultaneously displaying the second frame of the first video stream and the second frame of the second video stream;

wherein the second frame of the second video stream is a frame after the first frame of the second video stream;

wherein the step (c) comprises following steps after the step (b1) and before the step (b2):

decoding the first video stream but not decoding the second video stream while at least one frame of the first video content is displayed but the second video content is not displayed.

8. The electronic system of claim 6, comprising:

wherein the step (b) comprises:

(b1) decoding a first frame of the first video stream and a first frame of the second video stream, and simultaneously displaying the first frame of the first video stream and the first frame of the second video stream;

(b2) decoding a second frame of the first video stream and a second frame of the second video stream, and simultaneously displaying the second frame of the first video stream and the second frame of the second video stream;

wherein the second frame of the second video stream is a beginning frame of the second video stream;

wherein the step (c) comprises following steps after the step (b1) and before the step (b2):

decoding the first video stream but not decoding the second video stream while at least one frame of the first video content is displayed but the second video content is not displayed.

9. A video decoding method, applied to a video decoding module comprising at least one video decoder, comprising:

(a) applying the video decoding module to receive a first video stream for a first video content and a second video stream for a second video content;

(b) decoding the first video stream and the second video stream if both the first video content and the second video content are to be displayed; and (c) decoding the first video stream and the second video stream if the first video content is to be displayed but the second video content is not to be displayed;

wherein the step (a) comprises:

receiving a first frame of the first video stream, wherein the first frame of the first video stream has a first frame resolution;

wherein the step (b) comprises:

(b1) transcoding the first frame of the first video stream thereby the first frame of the first video stream has a second frame resolution, wherein the first frame resolution is higher than the second frame resolution; and (b2) simultaneously displaying the first frame of the first video content obtained in the step (b1) with other video content.

10. An electronic system, comprising:

a video decoding module, comprising at least one video decoder;

a video driving device, configured to control the video decoding module to perform following steps:

(a) receiving a first video stream for a first video content and a second video stream for a second video content;

(b) decoding the first video stream and the second video stream if both the first video content and the second video content are to be displayed; and (c) decoding the first video stream and the second video stream if the first video content is to be displayed but the second video content is not to be displayed;

wherein the step (a) comprises:

receiving a first frame of the first video stream, wherein the first frame of the first video stream has a first frame resolution;

wherein the step (b) comprises:

(b1) transcoding the first frame of the first video stream thereby the first frame of the first video stream has a second frame resolution, wherein the first frame resolution is higher than the second frame resolution; and (b2) simultaneously displaying the first frame of the first video content obtained in the step (b1) with other video content.

11. A video decoding method, applied to a video decoding module comprising at least one video decoder, comprising:

(a) applying the video decoding module to receive a first video stream for a first video content and a second video stream for a second video content;

(b) decoding the first video stream and the second video stream while both the first video content and the second video content are to be displayed; and (c) decoding the first video stream but not decoding the second video stream, if the first video content is to be displayed but the second video content is not to be displayed;

wherein the step (b) comprises:

(b1) decoding a first frame of the first video stream and a first frame of the second video stream, and simultaneously displaying the first frame of the first video stream and the first frame of the second video stream;

(b2) decoding a second frame of the first video stream and a second frame of the second video stream, and simultaneously displaying the second frame of the first video stream and the second frame of the second video stream;

wherein the second frame of the second video stream is a frame after the first frame of the second video stream, or the second frame of the second video stream is a beginning frame of the second video stream;

wherein the step (c) comprises following steps after the step (b1) and before the step (b2):

decoding the first video stream but not decoding the second video stream while at least one frame of the first video content is displayed but the second video content is not displayed.

12. An electronic system, comprising:

a video decoding module, comprising at least one video decoder;

a video driving device, configured to control the video decoding module to perform following steps:

(a) receiving a first video stream for a first video content and a second video stream for a second video content;

(b) decoding the first video stream and the second video stream while both the first video content and the second video content are to be displayed; and (c) decoding the first video stream but not decoding the second video stream, if the first video content is to be displayed but the second video content is not to be displayed;

wherein the step (b) comprises:

(b1) decoding a first frame of the first video stream and a first frame of the second video stream, and simultaneously displaying the first frame of the first video stream and the first frame of the second video stream;

(b2) decoding a second frame of the first video stream and a second frame of the second video stream, and simultaneously displaying the second frame of the first video stream and the second frame of the second video stream;

wherein the second frame of the second video stream is a frame after the first frame of the second video stream, or the second frame of the second video stream is a beginning frame of the second video stream;

wherein the step (c) comprises following steps after the step (b1) and before the step (b2):

decoding the first video stream but not decoding the second video stream while at least one frame of the first video content is displayed but the second video content is not displayed.

* * * * *